United States Patent [19]

Sato et al.

[11] Patent Number: 5,818,522

[45] Date of Patent: Oct. 6, 1998

[54] IMAGE PICKUP APPARATUS FOR OBTAINING A BETTER COLOR IMAGE OVER A WIDER LUMINANCE RANGE

[75] Inventors: Itsuzo Sato, Chigasaki; Kazushige Ooi, Fujisawa, both of Japan

[73] Assignee: Kabushiki Kaisha Toshiba, Kawasaki, Japan

[21] Appl. No.: 633,083

[22] Filed: Apr. 16, 1996

[30] Foreign Application Priority Data

Apr. 17, 1995 [JP] Japan ................................. 7-090904

[51] Int. Cl.⁶ .................................................. H04N 5/228
[52] U.S. Cl. .......................... 348/222; 348/223; 348/675
[58] Field of Search ................................... 348/222, 223, 348/224, 256, 675, 678, 679, 254, 259, 272, 266, 234, 235, 221, 229, 230, 362, 364, 366, 369, 655, 659, 660, 226

[56] References Cited

U.S. PATENT DOCUMENTS

| | | | |
|---|---|---|---|
| 4,779,137 | 10/1988 | Tojo et al. ............................... | 348/229 |
| 4,926,247 | 5/1990 | Nagasaki et al. ...................... | 348/262 |
| 5,038,205 | 8/1991 | Kondo et al. ........................... | 348/225 |
| 5,043,804 | 8/1991 | Sugiura ................................... | 348/226 |
| 5,138,458 | 8/1992 | Nagasaki et al. ...................... | 348/222 |
| 5,162,914 | 11/1992 | Takahashi et al. ..................... | 348/229 |
| 5,264,944 | 11/1993 | Takemura ............................... | 348/224 |
| 5,270,802 | 12/1993 | Takagi et al. .......................... | 348/223 |
| 5,455,621 | 10/1995 | Morimura ............................... | 348/229 |
| 5,457,494 | 10/1995 | Suga et al. .............................. | 348/229 |
| 5,489,939 | 2/1996 | Haruki et al. .......................... | 348/226 |
| 5,508,739 | 4/1996 | Suh ........................................ | 348/223 |
| 5,565,913 | 10/1996 | Matsui et al. .......................... | 348/228 |

FOREIGN PATENT DOCUMENTS 63-306780 12/1988 Japan .

OTHER PUBLICATIONS

Satou, et al: "A Dynamic Range Extended Color Camera Using Electronic Shuttering Scheme", Proceedings Of The 1995 ITE Annual Convention, Jul. 1995, pp. 63–64.

*Primary Examiner*—Wendy Garber
*Assistant Examiner*—Gene Auduong
*Attorney, Agent, or Firm*—Cushman Darby & Cushman IP Group of Pillsbury Madison & Sutro LLP

[57] ABSTRACT

A plurality of shutter times are set to an image pickup device and an image is taken in a way to separate an incident light amount range into a low and a high luminance and, through the signal processing, it is possible to take an image over a wider dark to bright light amount range and, in particular, obtain a better color reproduction over a wider luminance range. In the case where an (R-Y) signal and (B-Y) signal are processed with a low-speed and high-speed shutter signal obtained and the high-speed shutter signal is subjected to logarithmic conversion and a bias signal is applied to provide a continuity with the low-speed shutter signal, processing is performed on a comparing section, characteristic conversion section and calculating section so that a greater one of the (R-Y) and (B-Y) signals is subjected to logarithmic conversion and the other signal is subjected to characteristic conversion in accordance with a value corresponding to a conversion ratio. Further, in the case where a bias voltage is applied to the greater color difference signal, a bias voltage is found in accordance with a ratio of the greater color difference signal and smaller color difference signal and applied to the other smaller color difference signal.

4 Claims, 6 Drawing Sheets

FIG. 8B

IMAGE PICKUP APPARATUS FOR OBTAINING A BETTER COLOR IMAGE OVER A WIDER LUMINANCE RANGE

BACKGROUND OF THE INVENTION

1. Field of the Invention

The present invention relates to enlarging a dynamic range of a color television camera and, in particular, an image pickup apparatus for taking an image of a subject having a wider luminance range.

2. Description of the Related Art

A conventional color camera using an image pickup device such as a CCD, is design based on a relation of the limited storage capacitance of electric charges to its characteristic. A subject is imaged in such a way as to suppress an incident light amount from the subject onto a camera to a certain range. For this reason, upon the taking of a subject image outdoors it has not been possible to obtain a dynamic range for covering the luminance range of the subject, so that there is the problem with a resultant image taken.

With the conventional image pickup apparatus no color reproduction is achieved in a high luminance area and a color image signal is obtained in nearly white color. In the case where a subject whose luminance partially largely varies is taken, however, it has not been possible to obtain a better image on the conventional color image pickup apparatus.

SUMMARY OF THE INVENTION

It is accordingly the object of the present invention to provide a color image pickup apparatus which can enlarge an image-taking range of an image pickup device by driving the image pickup device at a plurality of different shutter speeds and effectively using color imaging signals obtained at the respective shutter speeds.

That is, a subject image is taken in a low luminance range and high luminance range of an amount of light incident from the subject and the respective color imaging signals are subjected to processing whereby it is possible to take a subject image in a wider dark to bright range of the subject.

In this case, the object of the present invention is to provide a color image pickup apparatus which, through the color signal processing in particular, obtains a better color subject image over a wide luminance range.

In order to achieve the above-mentioned object of the present invention, a subject image is taken by the image pickup device at a plurality of different shutter speeds and processing is done on a luminance signal and color signal in a plurality of video signals corresponding to the plurality of shutter speeds. Through the signal processing involving adding a high shutter speed signal to a low shutter speed signal or effecting a selective switching between the low shutter speed signal and the high shutter speed signal, it is possible to complete a final video signal.

Stated in more detail, in the color image pickup apparatus obtaining an operation at a plurality of different shutter speeds in which a second video signal obtained by a high-speed shutter operation is added to a first video signal obtained at the low-speed shutter operation or a switching is made between the first video signal and the second video signal, if the color difference signal obtained by the high-speed shutter is subjected to characteristic conversion in conjunction with the color signal processing, a specific one of a plurality of color difference signals is selected and subjected to characteristic conversion and, in this case, the color signal processing means performs the characteristic conversion of the other color difference signal with the use of information as a result of the characteristic conversion above.

In the above-mentioned color image pickup apparatus, a color image can be taken as a better image over a wider luminance range of the subject. Given that, for example, a subject image is taken at a low shutter speed of 1/60 in which case a high shutter speed is 1/10,000, a better subject image can be taken over a light amount range 166 times wider than that at an ordinary operation shutter of 1/60. It is, therefore, possible to take a better image from a subject of a very wide luminance difference range by setting a plurality of shutter speeds and to achieve a better color reproducibility at a high luminance area in particular.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The embodiments of the present invention will be explained below with respect to the present invention.

Figure 1:
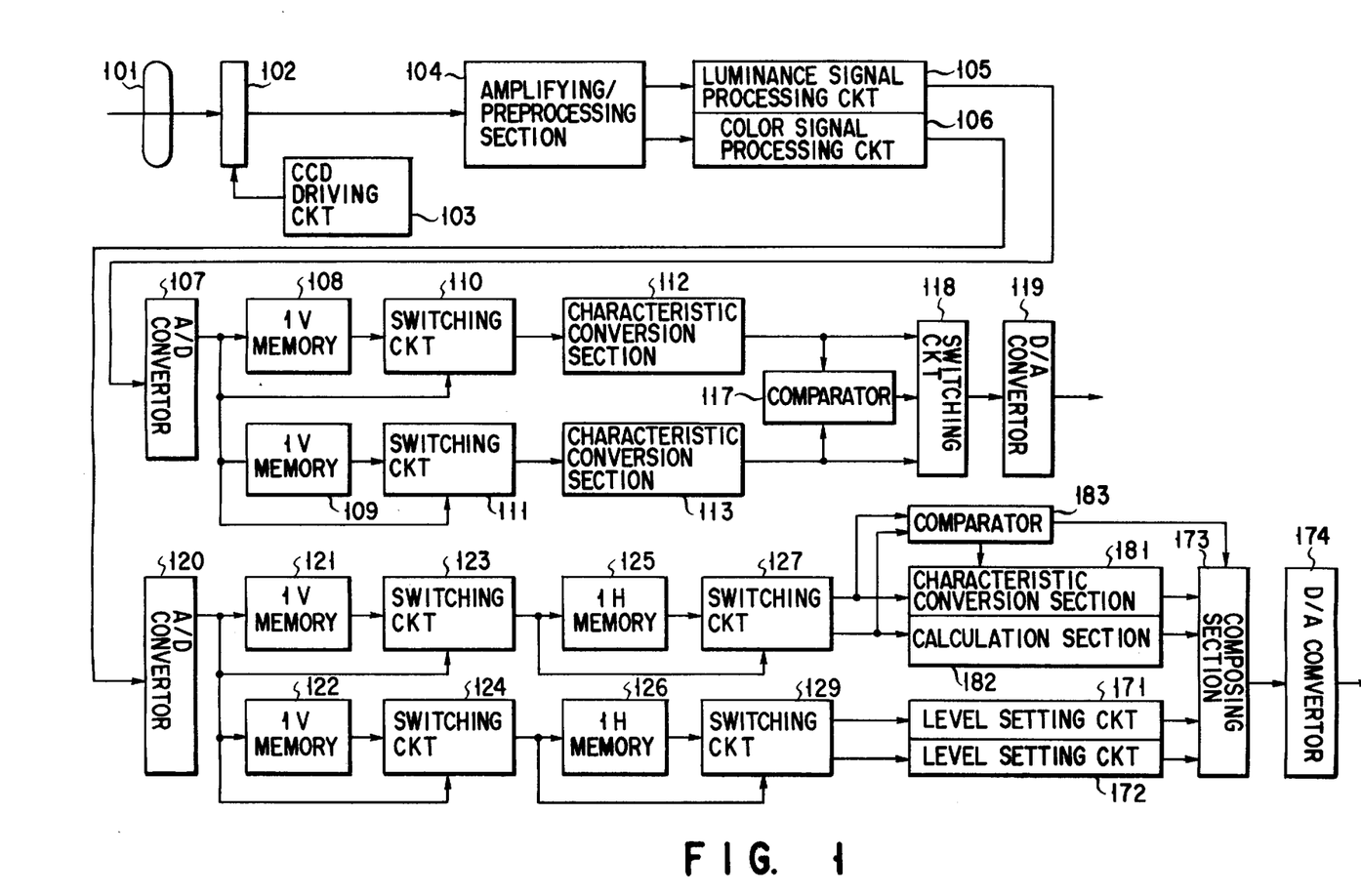
FIG. 1 shows a first embodiment of the present invention.

FIG. 1 shows a first embodiment of the present invention. A subject image passing through an imaging lens 101 is formed on an imaging surface of a CCD image pickup device 102. The CCD image pickup device 102 is controlled by a drive pulse from a CCD driving circuit 103. Further, the CCD driving circuit 103 sends a control signal to the CCD image pickup device 102 to allow the CCD image pickup device 102 to obtain a shutter operation in a first field at high speed and a shutter operation in a second field at low speed.

The CCD image pickup device 102 alternately delivers an imaging signal obtained at a high speed shutter and an imaging signal obtained at a low speed shutter. The imaging signal is amplified by an amplifying/pre-processing section 104 to a given level and separated into a luminance signal and a color signal. The luminance signal and color signal are sent to a luminance signal processing circuit 105 and color signal processing circuit 106, respectively, to allow these signals to be processed there.

The luminance signal processing system will first be explained below.

The luminance signal output from the illuminance signal processing circuit 105 is sent to an A/D (analog/digital) conversion section 107 where it is converted from an analog to a digital signal. The digital signal is input to 1V memories 108 and 109, that is, 1 vertical (1V) period delay memories, to separate corresponding signals into the signal (hereinafter referred to as a high speed shutter signal) obtained at the high speed shutter operation and signal (hereinafter referred to as a low speed shutter signal) obtained at a low speed shutter operation. The input-and output-side signals of the 1V memory 108 are input to a switching circuit 110 and the input-and output-side signal of the 1V memory 109 are input to a switching circuit 111. The switching circuits 110 and 111 deliver the high-and low-speed shutter signals, which are intermittent signals, as continuous signals. In other words, a high and a low speed shutter signal are obtained from the switching circuits 110 and 111.

Figure 2:
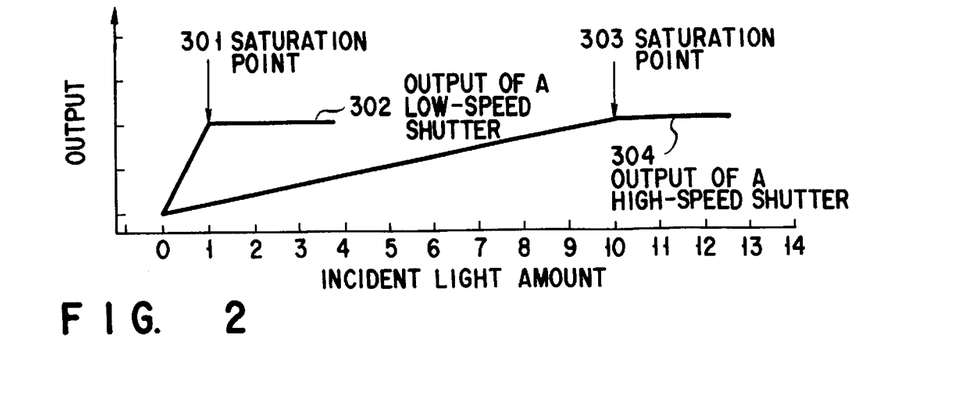
FIG. 2 is a view showing a video image output characteristic by a shutter operation.

FIG. 2 shows a relation of a light amount incident through the low speed shutter operation of the CCD image pickup device 102 to a video output and a relation of a light amount incident though the high-speed shutter operation to a video output. In FIG. 2, 302 shows a video output characteristic obtained from the low speed shutter operation and 304 shows an output characteristic obtained from the high speed shutter operation 304. Further, 301 shows a saturation point of the output from a low speed shutter operation and 303 a saturation point from the high speed shutter operation.

The signals of these two characteristics are logarithmically converted by characteristic conversion sections 112 and 113 in FIG. 1 to obtain, for example, gamma characteristics.

Figure 3:
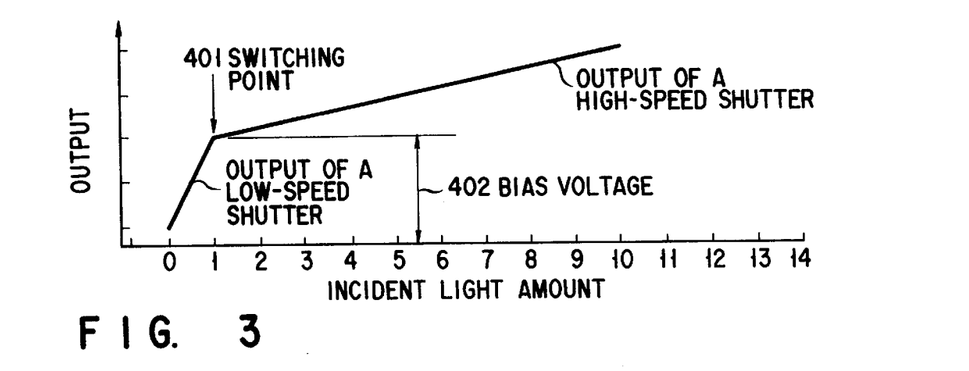
FIG. 3 is an explanatory view showing a video image switching.

The logarithmic conversion characteristics need to be varied in accordance with different shutter speeds. The high speed shutter signal is additively combined with a bias voltage 402, as shown in FIG. 3, by an adding section and bias setting section (not shown). The two signals above are switched from the low speed to the high speed shutter signal at a switching point 401, as shown in FIG. 3, in accordance with an incident light amount. The bias voltage 402 constitutes a voltage added upon switching from the low speed to the high speed shutter signal to achieve signal continuity. This switching control signal can be prepared with the use of either the high speed or the low speed shutter signal. The switching control signal is prepared by a comparing section 117 and supplied to a control terminal of a switching circuit (a composing device) 118. From the switching circuit 118 it is possible to obtain a signal of a characteristic with the low speed and high speed shutter signals composed as shown in FIG. 3. The output signal of the switching circuit 118 is converted by a D/A conversion section 119 to an analog signal.

Now a color signal processing system will be explained below.

On the color signal the following processing is performed.

In the system use is made of line sequential color difference signals (R-Y), (B-Y) obtained from the color signal processing circuit 106. With a single plate type CCD color video imaging device, usually the (R-Y) signal and (B-Y) signal are derived with a line sequential signal. Even in the color difference signals (R-Y) signal, (B-Y) signal, a high speed and low speed shutter signal are alternately output at a vertical synchronization cycle as in the case of the luminance signal. The line sequential color difference signals (R-Y), (B-Y) are converted to digital signal by an A/D convertor 120.

The digital signal is input to two 1V memories 121, 122 constituting 1 vertical interval memories. The input- and output-side signals of the 1V memory 121 are input to a switching circuit 123 and the input-and output-side signals of the 1V memory 122 are input to a switching circuit 124. The switching circuits 123, 124 deliver, as continuous signals, the high and low speed shutter signals constituting intermittent signals. That is, the high speed shutter signals, (R-Y) signal, (B-Y) signal, and low speed shutter signals, (R-Y) signal, (B-Y) signal, are obtained from the switching circuits 123 and 124, respectively.

The (R-Y) signal and (B-Y) signal, being line sequential, are subjected to synchronization processing. The outputs of the switching circuits 123, 124 are supplied to 1H memories 125, 126 with a one-horizontal (1H) delay. High speed shutter signals on the input and output sides of the 1H memory 125 are input to a switching circuit 127 and low speed shutter signals on the input and output sides of the 1H memory 126 are input to a switching circuit 129.

By doing so, a synchronized high speed shutter (R-Y) signal and (B-Y) signal are obtained from the switching circuit 127 and a synchronized low speed shutter (R-Y) signal and (B-Y) signal are obtained from the switching circuit 129. The low speed shutter (R-Y) signal and (B-Y) signal from the switching circuit 129 is input to a composing section 173 after having their reference levels set by level setting circuits 171, 172.

The high speed shutter (R-Y) signal and (B-Y) signal obtained from the switching circuit 127 are input to a characteristic conversion processing section constituting a characteristic conversion section 181 and calculation section 182. These signals are subjected to characteristic conversion to allow color reproduction to be made more naturally upon being projected as an image. The resultant signals are input to the composing section 173.

Here, in the case where processing is made by the characteristic conversion section 181, the procedure is like this, that is, a greater level one of the (R-Y) signal and (B-Y) signal is subjected to characteristic conversion and, according to the conversion ratio, the other signal is converted through the calculation processing of the calculation section 182. The reason above, as will be set out below, is that, if both the (R-Y) signal and (B-Y) signal on separate axis components are subjected to the same characteristic conversion, a signal composed from the (R-Y) signal and (B-Y) signal after characteristic conversion is deviated from its original hue. Out of the (R-Y) signal and (B-Y) signal, the greater one is detected by a comparing section 183. Further, the comparing section 183 also detects the switching point as shown in FIG. 3, controlling a select state of the composing section 173.

Since this system greatly enlarges the dynamic range of, particularly, the imaging of the color signal and color reproduction of the imaged color signal, an important area at the signal processing lies in the characteristic conversion section 181 and calculation section 182.

Figure 4:
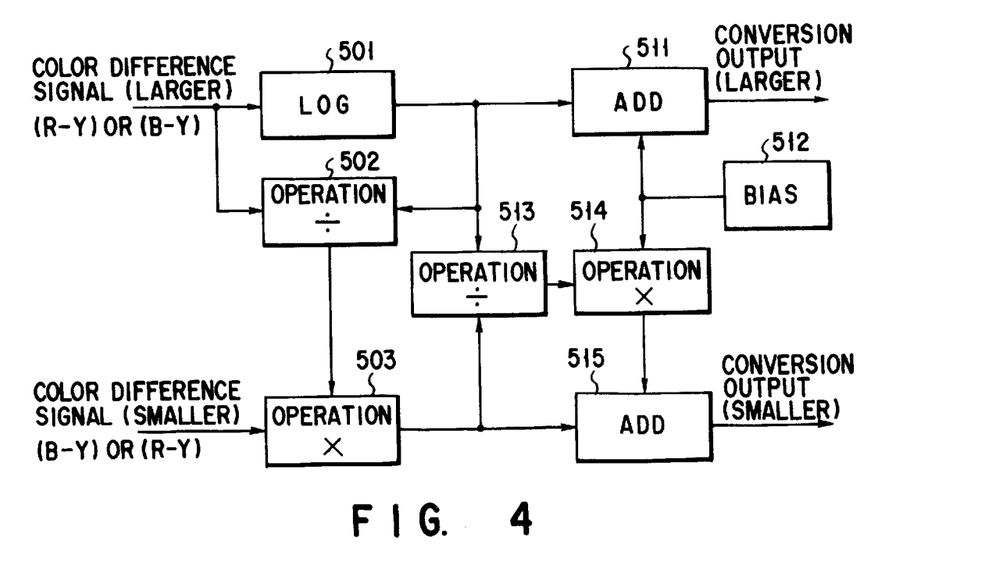
FIG. 4 is a schematic view showing a color signal processing section.

FIG. 4 shows an important schematic example, in particular, of the characteristic conversion section 181 and calculation section 182. Out of the color difference signals the greater one is input to, for example, a logarithmic converter 501 for characteristic conversion. The rate of conversion by the characteristic conversion is found by dividing signals on the input-and output-side of the logarithmic conversion section 501 by a calculator 502. Through the multiplication of the factor representing the conversion rate relative to the other color difference signal by a calculator 503, therefore, said other color difference signal is fit for the larger level signal to achieve characteristic conversion.

Figure 5:
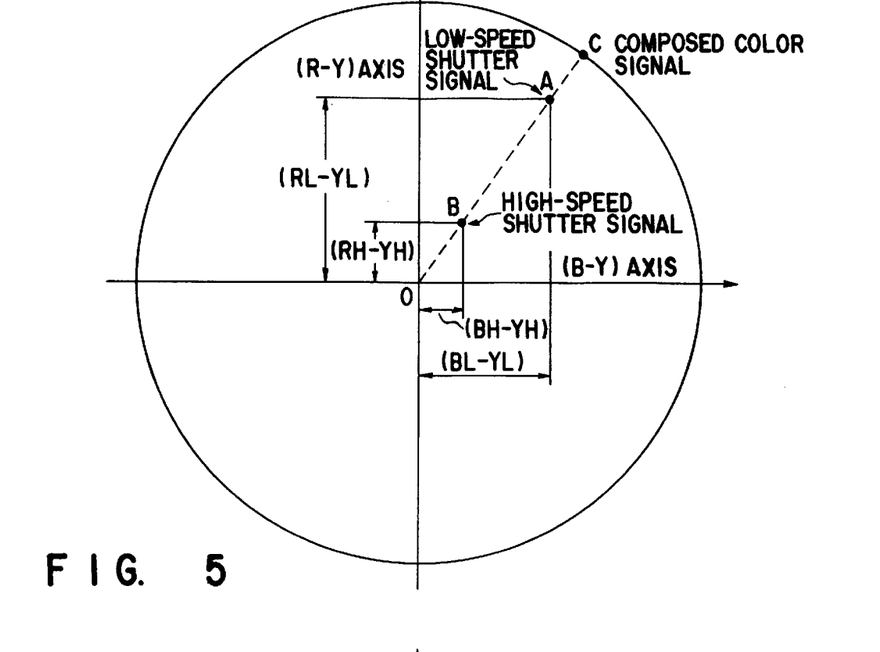
FIG. 5 is an explanatory view showing the vectors of color component signals.

This can be understood from FIG. 5. In FIG. 5, the low speed shutter signal is indicated by (RL-YL), (BL-YL) and the high speed shutter signal by (RH-YH), (BH-YH). Since (RH-YH)>(BH-YH) is an illustrated example, the (RH-YH) signal is subjected to logarithmic conversion. Here, if the (BH-YH) signal is also subjected to logarithmic conversion, no original vector is obtained upon composition of the logarithmically converted (RH-YH) and (BH-YH) signals, resulting in a controlled one. It is, therefore necessary to perform the above-mentioned characteristic conversion processing. Stated briefly, out of the two color difference signals the greater level one is subjected to logarithmic conversion and through the multiplication of the factor representing the conversion rate times said other color difference signal it is possible to achieve the characteristic conversion in a form in which said other color difference signal is fit for the greater level signal.

To the high speed shutter signal it is necessary to add the bias voltage at the switching point as explained in conjunction with FIG. 3. Therefore, to the output of the logarithmic converter 501 a bias voltage from a bias circuit 512 is added at an adder 511 as shown in FIG. 4. On the other hand, a bias voltage has to be added also to the output of the calculator 503 but, if, as in the case of its being added to the output of the logarithmic converter 501, it is simply added to the output of the calculator 503, then the added two color difference signals, upon being composed, will have its resultant signal vector oriented in a direction different from its original one.

With these in view, the output of the logarithmic converter 501 and that of the calculator 503 are input to a calculator 513 and a ratio of both is found through a dividing operation at the calculator 513. By this ratio the bias voltage from the bias circuit 512 is multiplied at a calculator 514 to obtain a corrected bias voltage. The corrected bias voltage from the calculator 514 is added by a calculator 515 to the output of the calculator 503.

By doing so, there is no variation between the sense of a vector composed before the addition of a bias voltage to the two color difference signals and that of a vector composed after the addition of a bias voltage to the two color difference signals.

Figure 6:
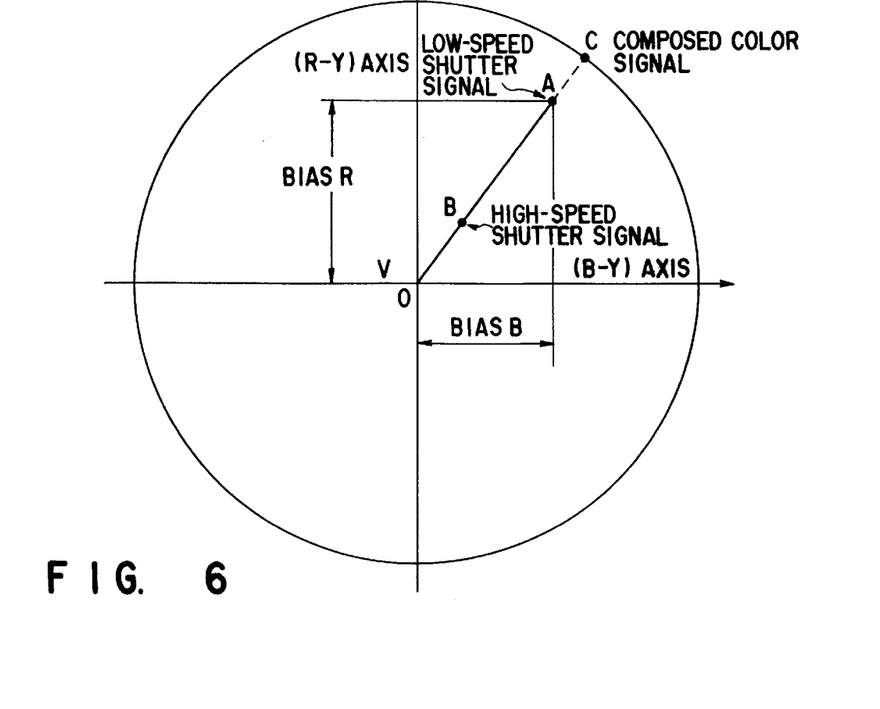
FIG. 6 is an explanatory view for explaining a bias voltage, in particular, in the vector diagram of the color component signals.

This is understandable from FIG. 6. As shown in FIG. 6 the levels of the (R-Y) signal and (B-Y) signal differ in accordance with the hue. If a bias is applied to these signals, then the senses of their vectors are deviated from their original ones when the same bias voltage is applied to both. Through the above-mentioned processing, however, there is no variation between the sense of the vector composed before the addition of a bias voltage to the two color difference signals and that of the vector composed after the addition of a bias voltage to these two color difference signals.

The basic embodiment of the present invention is as set out above.

Another practical embodiment of the present invention is shown below.

Figure 7:
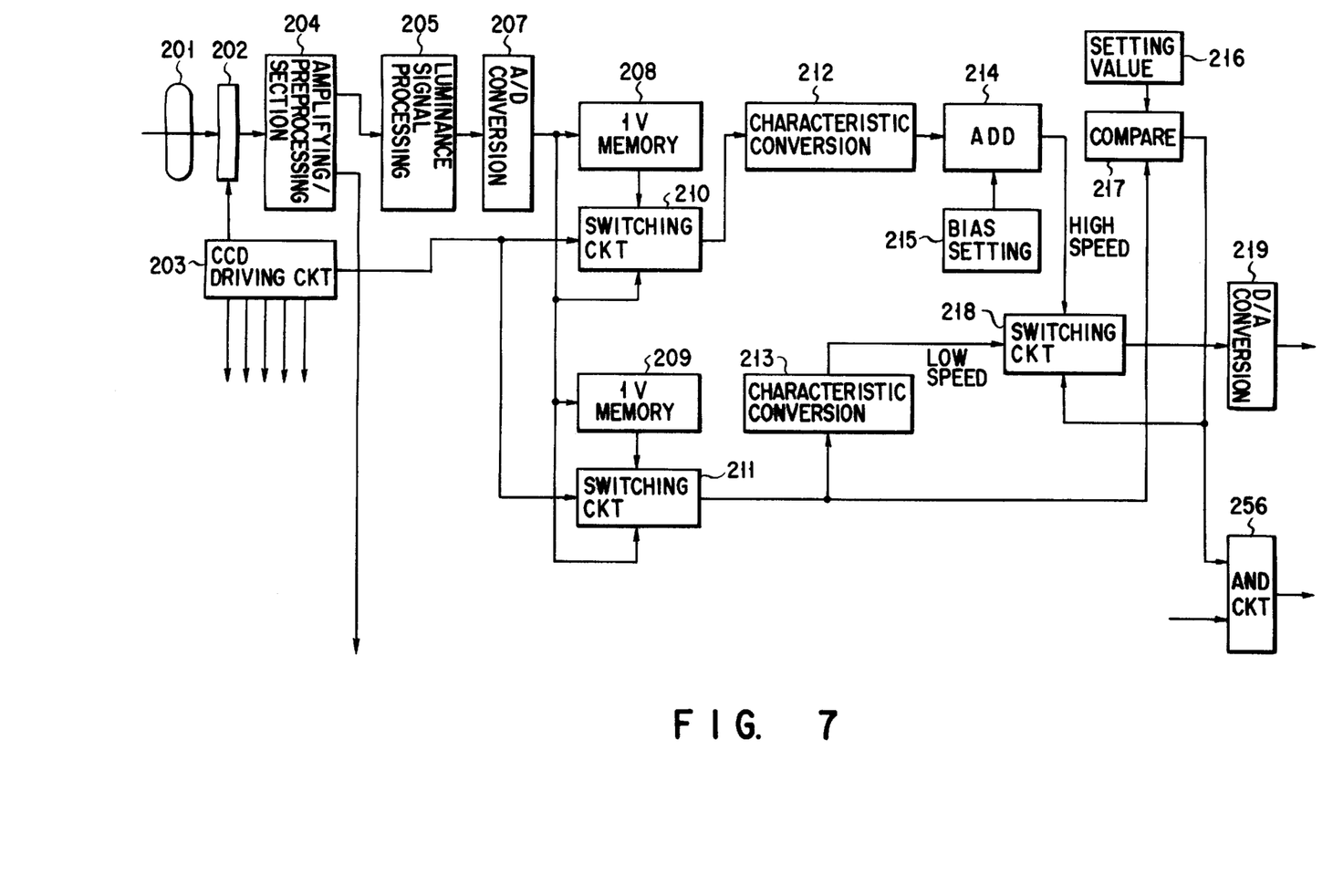
FIG. 7 is a practical circuit diagram showing a luminance signal system in a second embodiment of the present invention.
Figure 8A:
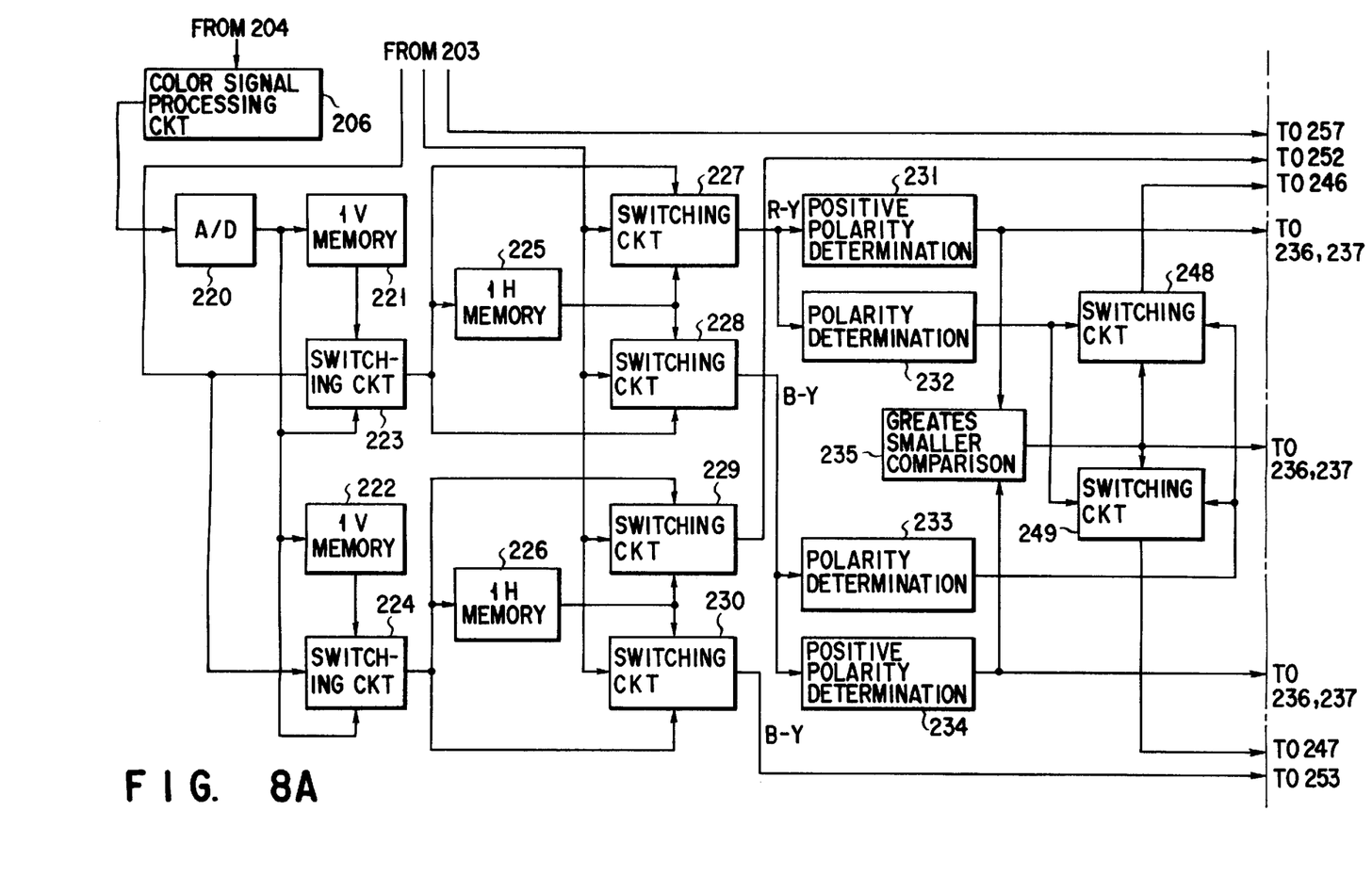
FIG. 8A is a practical circuit diagram of a color signal system in the second embodiment of the present invention.
Figure 8B:
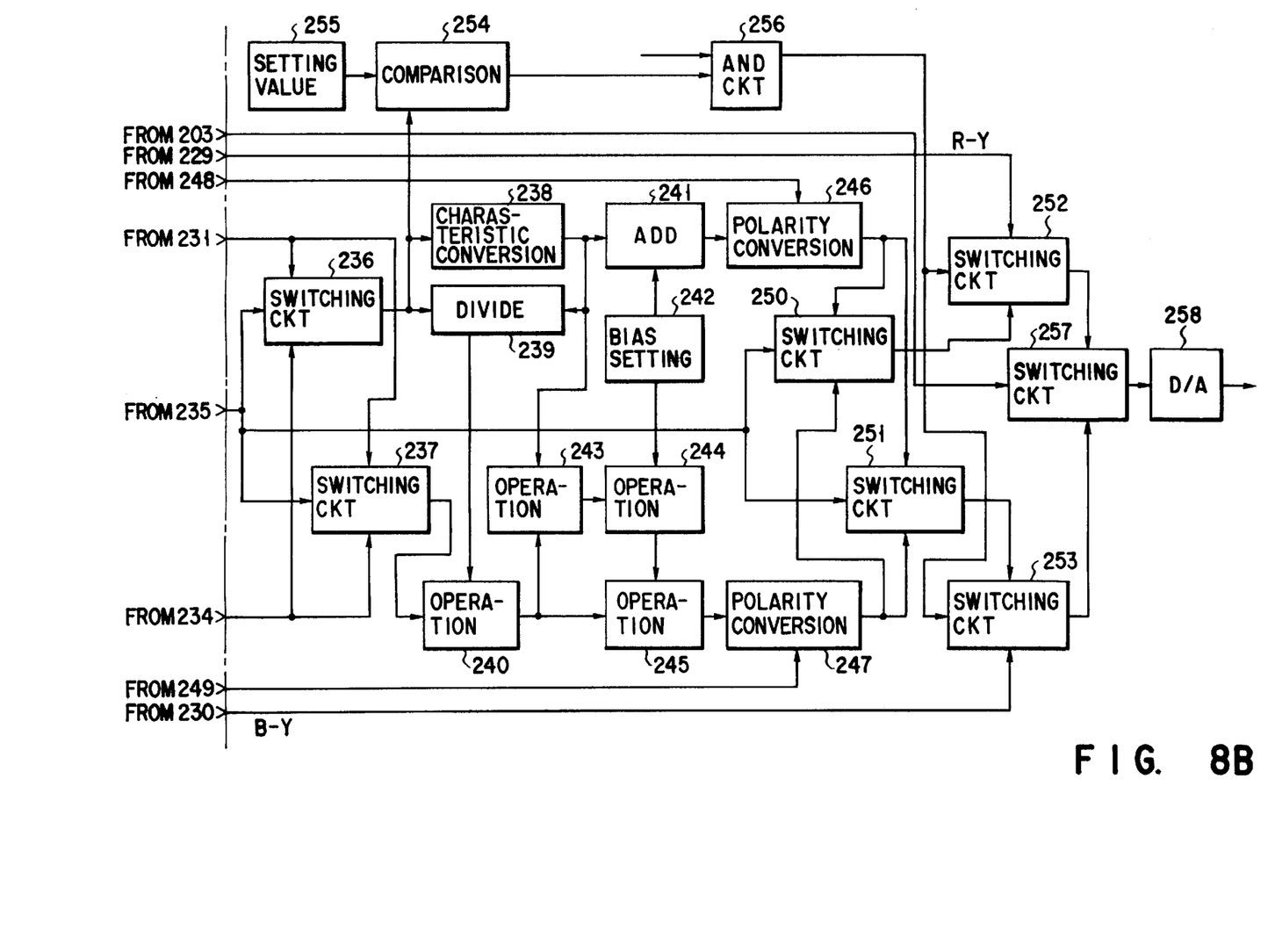
FIG. 8B is a view continued from FIG. 8A.

FIG. 7 shows a luminance signal system and FIGS. 8A and 8B show a color signal processing system.

First, the luminance signal system will be explained below.

A subject image taken by an imaging lens 201 is formed on an imaging surface of a CCD image pickup device 202. The CCD image pickup device 202 is controlled by a drive pulse from a CCD driving circuit 203. The CCD driving circuit 203 supplies a control signal to the CCD image pickup device 202 to allow the CCD image pickup device 202 to obtain a shutter operation in a first field at high speed and a shutter operation in a second field at low speed.

The CCD image pickup device 202 alternately delivers the high speed shutter signal and low speed shutter signal as output signals. These signals are amplified by an amplifier/pre-processing section 204 to predetermined levels and separated into a luminance signal and color difference signal. These signals are sent to a luminance signal processing circuit 205 and from there to a color signal processing circuit 206 for processing.

The luminance signal is converted by an A/D conversion section 207 from an analog signal to a digital signal. The digital signal is input to two switching circuits 210 and 211, that is, 1 vertical period memories, where these signals are separated into a high speed and low speed shutter signal and further transformed from their intermittent signals to continuous signals.

These two signals are subjected to, for example, logarithmic conversion by characteristic conversion sections 212 and 213. It is required that their logarithmic conversion characteristics be varied in accordance with the different shutter speeds. The high speed shutter signal is added by an adder section 214 and bias setting section 215 to a bias voltage 402 of a level corresponding to a switching point 401 as explained in FIG. 3. The low speed shutter signal is delivered from the characteristic conversion section 213 and the low speed shutter signal output is switched by a switching circuit 218 to the high speed signal output at the switching point 401. The bias voltage 402 is so added as to secure signal continuity when the low speed shutter signal is switched to the high speed shutter signal.

A switching control signal can be prepared using either the high speed shutter signal or the low speed shutter signal, but the low speed shutter signal is used in this embodiment.

A comparing circuit 217 compares a setting value of a comparing value setting section 216 with the output of the switching circuit 211 to detect a switching point. The comparing circuit 217 controls the switching circuit 218 to allow a low speed shutter signal select state to be switched to a high speed shutter signal select state when the low speed shutter signal is greater than the setting value. The output signal of the switching circuit 218 is sent to the D/A conversion section 219 where the digital signal is converted to an analog signal.

In this way, a low-luminance subject (or its portion) is taken with a low speed shutter signal and a high-luminance subject (or its portion) with a high speed shutter signal and it is possible to take a picture corresponding to a subject ranging from a low to a high luminance.

Now the color signal processing system will be explained below.

The color signal processing system is shown ranging from FIG. 8A to FIG. 8B. The CCD image-taking signal is converted by the color signal processing circuit 206 to two color difference signals: an (R-Y) signal and (B-Y) signal. In the single-plate CCD color video image pickup device, usually the (R-Y) signal and (B-Y) signal become line sequential signals. The embodiment will now be explained in conjunction with a system using the color difference signals.

The color difference signal has its high and low speed shutter signals alternately emerge at a vertical synchronizing cycle. The color difference signal is converted by an A/D conversion section 220 from an analog to a digital form. The digital signal is input to 1V memories 221, 222, that is, 1 vertical period memories and to switching circuits 223, 224. The outputs of the 1V memories 221, 222 are also supplied to the switching circuits 223, 224, respectively. A high speed and a low speed shutter signal are derived from the switching circuits 223 and 224, respectively.

The two color difference signals, that is, (R-Y) signal and (B-Y) signal alternately emerge at each 1 horizontal period. In order to convert the color difference signal to a continuous signal use is made of 1H memories 225, 226 with one horizontal period delay as well as switching circuits 227, 228 and 229, 230. At the same time, separation is made into a series of (R-Y) signals and a series of (B-Y) signals.

The output signal of the switching circuit 223 is supplied to the 1H memory 225 and switching circuits 227, 228 and the outputs of the 1H memory 225 are supplied to the switching circuits 227, 228. The output signals of the switching circuit 224 are supplied to the 1H memory 226 and switching circuits 229, 230. The output signals of the 1H memory 226 are supplied to the switching circuits 229 and 230. The high speed shutter (R-Y) signal and high speed shutter (B-Y) signal are derived from the switching circuits 227 and 228, respectively, and the low speed shutter (R-Y) signal and low speed shutter (B-Y) signal are derived from the switching circuits 229 and 230, respectively.

The high speed shutter signal system will be explained below.

The high speed shutter color difference (R-Y) signal is sent to a positive polarity conversion section 231 and polarity determining section 232. The high speed shutter color difference (B-Y) signal is sent to a positive polarity conversion section 234 and polarity determining section 233. The two color difference signals of the high speed shutter signals are converted by the positive polarity conversion sections to a positive polarity. This is because the color difference signals may take positive and negative polarities and, at a subsequent stage, the ready handling of these signals is ensured.

In the A/D conversion processing, for the case of an eight-bit circuit for instance, 255 signal levels at max. can be represented in decimal notation, but, with the 128-th level (one-half level) set as a center, the zero level of the color difference signal is made to correspond to that center. Therefore, those levels smaller than the center level are folded back with the 128-th level as a zero so that the polarity conversion is made by the positive conversion section to achieve a positive polarity. At the same time, the folded-back signal is monitored by the polarity determining section and later used to bring it back to its polarity.

The outputs of these two positive polarity conversion sections 231, 234 are input to a larger/smaller comparing section 235, the output of which is sent to switching circuits 236 and 237 (FIG. 8B).

The comparing circuit 235 compares the (R-Y) signal and (B-Y) signal and so controls as to enable a greater one and smaller one to be selected at the switching circuits 236 and 237, respectively. The greater signal is sent to a characteristic conversion section 238 to be given a logarithmic conversion characteristic.

In the logarithmic conversion processing, as already set out above, the (R-Y) signal and (B-Y) signal, simply being subjected to logarithmic conversion, produce a change in hue. In the case where these two signals are positive in polarity and the (R-Y) signal is greater than the (B-Y) signal, a composed signal varies in their hues before and after conversion and becomes near to the (B-Y) axis as shown in FIG. 5. That is, through logarithmic conversion, the ratio of these two color difference signals becomes smaller and nearer to the axis of the smaller color difference signal.

In order to eliminate a variation in the hue, the following signal processing is carried out. A calculating section 239 performs an operation (dividing operation) with the use of an input signal and the output of the characteristic conversion section 238. A calculating section 240 performs an operation, that is, multiplies the smaller signal by a result of the dividing operation. This means that the result of the characteristic conversion is secured by performing the characteristic conversion of the (R-Y) signal and (B-Y) signal relatively at the same ratio. By doing so, the color signals are subjected to the characteristic conversion without the degeneration of the hue.

Then the output of the characteristic conversion section 238, like the luminance signal, is sent to an adding section 241 where a bias voltage from the bias setting section 242 is added to the output of the characteristic conversion section. The bias voltage is used to secure a continuous color signal when the latter signal is switched from the low speed to the high speed shutter signal. This bias voltage also need to be applied to the other color difference signal. However, applying the same bias voltage results in a color deformation. This is because the (R-Y) signal and (B-Y) signal have their color component level ratio differ by color as understandable from the diagram in FIG. 6.

In the diagram as shown in FIG. 6, the point A represents a color component signal vector by the low speed shutter operation and the color signal component increases from a point O toward the point A. Upon reaching a saturation point of the point A, the color signal component decreases in the case of the single-plate CCD color camera so that it disappears. It is, therefore, required that, in order to secure a color reproduction even at a high luminance level, a bias voltage level at the point A be applied to the color signal component by the high-speed shutter operation. Here, as shown in FIG. 6, the (R-Y) signal and (B-Y) signal naturally have their color components differ in accordance with their hue and it is necessary to apply bias signals (bias R) and (bias B) of levels on those separate (R-Y) and (B-Y) axes at the point A. When two bias voltages are required for the separate low speed (R-Y) signal for example at (R-Y) signal=1 and (B-Y) signal=0.5, a ratio is found between the (R-Y) signal and the (B-Y) signal and the ratio is multiplied by the above-mentioned bias voltages to find unity which, being added to the (B-Y) signal, allows the above-mentioned switching to be achieved without involving a change in hue.

For this reason, through the use of the output of the characteristic conversion section 238 and result of the calculation section 240 a calculation section 243 performs an operation (dividing operation) between the two color signal components, the output of the calculation section 243 is supplied to the next calculation section 244 where it is multiplied by the bias voltage from the bias setting section 242 to provide a bias voltage corresponding to the hue of the color signal component. This bias voltage is added by an adder 245 to an adding section 244.

The color difference signals from the adding section 241 and calculating section 240 are returned by the polarity conversion sections 246 and 247, respectively, back to color signal formats before the above-mentioned positive polarity conversion. The polarity conversion sections 246 and 247 are controlled by the signals from the switching circuits 248 and 249. To a switching circuit 248 is applied the polarity information determined by the polarity determining sections 232 and 233. Also to a switching circuit 249 is applied the polarity information determined by the polarity determining sections 232 and 233. In response to the result of the greater/smaller comparing section 235 the switching circuits 248 and 249 select the polarity information from the polarity determining section 232 or 233. By doing so, in the polarity conversion sections 246, 247, it is possible to obtain a polarity conversion corresponding to the color difference signals output from the switching circuits 236, 237.

Those color signals returned back to their original formats by the polarity conversion sections 246, 247 are not separated into the (R-Y) signal and (B-Y) signal. Therefore, the color difference signal from the polarity conversion section 246 is input to the switching circuits 250, 251 and the color difference signal from the polarity conversion section 247 is also input to the switching circuits 250, 251. Here, the switching circuits 250, 251 use the signal from the greater/smaller comparing section 235 to achieve a separation into the (R-Y) signal and (B-Y) signal, respectively. The switching circuit 250 selects the (R-Y) signal and delivers it to a switching circuit 253.

The low speed shutter (R-Y) signal 229 is supplied from the switching circuit 229 to the switching circuit 252 and the low speed shutter (B-Y) signal is supplied from the switching circuit 230 to the switching circuit 253.

The switching circuits 252 and 253 are of such a type as to achieve a switching between the low speed and the high speed shutter color signal in accordance with their light amount. The switched signals of the switching circuits 252 and 256 are delivered to an AND circuit 256.

In order to obtain the switching signal for a color signal here used, it is possible to use a switching signal for the luminance signal obtained at the comparing circuit 217. Further, a greater one of the two color difference signals by the high speed shutter is received from the switching circuit 236 and it is compared by a comparing section 254 with a setting value of a setting section 255. When it is greater than the setting value, the comparing section detects the high speed shutter signal. By doing so it is also possible to obtain a switching signal. Further, the switching signal (obtained at the comparing section 217) referring to the luminance signal may be produced at a non-color occurrence time needing no switching operation. With the present embodiment, therefore, final switching signals are obtained, from two switching signals for the luminance signal and color signal, with the use of the AND circuit 256.

The (R-Y) and (B-Y) signals obtained from the switching circuits 252 and 253, being line sequentially converted at the switching circuit 257, are input to a D/A conversion section where they are converted from the digital to the analog signal. The switching circuit 257 is not, in particular, necessary but such a circuit arrangement as set out above is adopted so as to take the same signal format as that of the input signal of the A/D conversion circuit.

According to the present invention, as set out above, an image is taken with a plurality of electronic shutters and processing is made on an image signal obtained so that the taking of the image can be achieved over a wider light amount range. Further, if a plurality of shutter speeds are used, it is possible to take a subject image of a much wider light amount range. If no account is taken of the continuity of the taken image signal, it is possible to take and view a subject of very high luminance and subject of very low luminance at the same time. This provides a special monitoring color camera apparatus to the resultant advantage. In particular, the color signal processing can be performed also on an ordinary color image pickup apparatus through the use of the color difference signals. Further it is possible to obtain a color imaging signal of better color reproducibility.

Although in the above-mentioned embodiment the (R-Y) and (B-Y) signals have been shown as the color difference signals, it may be possible to use Q and I signals instead. Although the switching point has been explained as a point of switching between the low speed shutter signal and the high speed shutter signal, the present invention is not restricted thereto. It may be possible to obtain the same function of the above-mentioned embodiment by additionally combine the low speed and high speed signal and adjusting their gain. Further, an overlapped area may be provided near the switching point in which case the low speed and high speed shutter signals are added together at the overlapped area.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color image pickup apparatus including a color image pickup device using a video signal obtained at a low shutter speed and a video signal at a high shutter speed, comprising color signal processing means having means for, when a color signal obtained at a high shutter speed is subjected to characteristic conversion, selecting a specific color difference signal of a plurality of color difference signals in the color signal and subjecting the specific color difference signal to characteristic conversion, and means for, with the use of conversion information of the specific color difference signal subjected by said means to characteristic conversion, subjecting the other color difference signal to characteristic conversion.

2. The color image pickup apparatus according to claim 1, wherein the color signal processing means has means for selecting a greater level one of the plurality of color difference signals as the specific color signal and providing a logarithmic conversion characteristic to the specific color difference signal;

means for finding a conversion ratio by calculating those color signals, one before providing the logarithmic conversion characteristic and one after providing the logarithmic conversion characteristic, and means for subjecting said other color difference signal to characteristic conversion by calculating the conversion ratio and said other color difference signal.

3. The color image pickup apparatus according to claim 1, wherein said color signal processing means has means for adding a first bias signal to a greater level one of the plurality of color difference signals;

means for calculating a ratio of the greater level one of the plurality of color difference signals and said other color difference signal of a low level;

means for preparing a second bias signal varied by the ratio from the first bias signal; and means for adding the second bias signal to said other color difference signal of a low level.

4. The color image pickup apparatus according to claim 1, wherein, in the color image pickup device using a video signal obtained at a low shutter speed and a video signal at a high shutter speed, the color signal processing means has first means for selecting a greater level one of the plurality of color difference signals as the specific color difference signal and subjecting the specific color difference signal to logarithmic conversion characteristic, second means for finding a conversion ratio by calculating those color signals, one before providing the logarithmic conversion characteristic and one after providing the logarithmic conversion characteristic, third means for subjecting said other color difference signal to characteristic conversion by calculating the conversion ratio and said other color difference signal, fourth means for adding a first bias signal to an output signal of the first means, fifth means for calculating a level ratio between an output signal of the first means and that of the third means;

sixth means for preparing a second bias signal varied by the ratio from the first bias signal, and seventh means for adding the second bias signal to the output signal of the third means.

* * * * *